US008822625B2

(12) United States Patent
Garrett et al.

(10) Patent No.: US 8,822,625 B2
(45) Date of Patent: Sep. 2, 2014

(54) METHOD FOR PROVIDING HIGHER MOLECULAR WEIGHT NATURAL OIL POLYOLS WITHOUT LOSS OF FUNCTIONALITY

(75) Inventors: Thomas M Garrett, Corona, CA (US); Xian Xian Du, Pittsburg, KS (US)

(73) Assignee: MCPU Polymer Engineering, LLC, Corona, CA (US)

( * ) Notice: Subject to any disclaimer, the term of this patent is extended or adjusted under 35 U.S.C. 154(b) by 63 days.

(21) Appl. No.: 13/374,228

(22) Filed: Dec. 16, 2011

(65) Prior Publication Data

US 2012/0116043 A1    May 10, 2012

Related U.S. Application Data

(63) Continuation-in-part of application No. 12/927,086, filed on Nov. 5, 2010.

(60) Provisional application No. 61/335,439, filed on Jan. 7, 2010.

(51) Int. Cl.
*C08G 18/42* (2006.01)
*C11C 3/00* (2006.01)
*C11C 1/04* (2006.01)
*C08G 18/68* (2006.01)

(52) U.S. Cl.
CPC .. *C08G 18/68* (2013.01); *C11C 1/04* (2013.01)
USPC .......................... 528/74.5; 554/163

(58) Field of Classification Search
CPC .................................. C08G 8/42; C11C 3/00
See application file for complete search history.

(56) References Cited

U.S. PATENT DOCUMENTS

| | | | |
|---|---|---|---|
| 2,882,249 A * | 4/1959 | Posnansky | 525/111 |
| 3,485,779 A | 12/1969 | Gast et al. | |
| 4,025,477 A | 5/1977 | Borden et al. | |
| 4,094,838 A | 6/1978 | Schneider et al. | |
| 4,174,329 A | 11/1979 | Bell et al. | |
| 4,190,448 A * | 2/1980 | Sera et al. | 430/216 |
| 4,294,736 A * | 10/1981 | Burgess et al. | 554/172 |
| 4,508,853 A | 4/1985 | Kluth et al. | |
| 4,551,517 A | 11/1985 | Herold et al. | |
| 4,742,087 A | 5/1988 | Kluth et al. | |
| 4,886,893 A | 12/1989 | Meffert et al. | |
| 5,266,714 A * | 11/1993 | Stoll et al. | 252/182.18 |
| 5,302,626 A | 4/1994 | Hoefer et al. | |
| 5,476,969 A | 12/1995 | Hinz et al. | |
| 6,107,433 A | 8/2000 | Petrovic et al. | |
| 6,121,398 A | 9/2000 | Wool et al. | |
| 6,180,686 B1 | 1/2001 | Kurth | |
| 6,433,121 B1 | 8/2002 | Petrovic et al. | |
| 6,433,125 B1 | 8/2002 | Gruetzmacher et al. | |
| 6,573,354 B1 | 6/2003 | Petrovic et al. | |
| 6,686,435 B1 | 2/2004 | Petrovic et al. | |
| 6,762,274 B2 | 7/2004 | Waddington et al. | |
| 6,891,053 B2 | 5/2005 | Chasar et al. | |
| 6,924,321 B2 | 8/2005 | Casati et al. | |
| 2006/0041157 A1 | 2/2006 | Petrovic et al. | |

OTHER PUBLICATIONS

Joseph V. Koleske, Polyurethane Coatings, 1995, Astm.Org, p. 89.*
de Kraker, J.W. ; Schurink, M.; Franssen, M.C.R. ; Konig, W. A; de Groot, A.; and Bouwmeester, H.J.. "Hydroxylation of Sesquiterpenes by Enzymes From Chicory (*Cichorium intybus* L.) Roots." *Tetrahedron*, 59(2003), pp. 409-418.
Cirino, P.C. and Arnold, F.H.. "Regioselectivity and Activity of Cytochrome P450 BM-3 and Mutant F87A in Reactions Driven by Hydrogen Peroxide." *Advance Synthetics Catalog* 344, No. 9(2002), pp. 932-937.
Groves, J.T. and Viski, P.. "Asymmetric Hydroxylation by a Chiral Iron Porphyrin." *Journal of American Chemistry Society* 111(1989), pp. 8537-8538.
Balandrian, M. F.; Klocke, J.A.; Wurtele, E.S. ; Bollinger, W.H.. "Natural Plant Chemicals: Sources of Industrial and Medicinal Materials." *Science,* 228(1985), pp. 1154-1160.
Findly, T.W.; Swern, D. and Scanlan, J.T.. "Epoxidation of Unsaturated Fatty Materials with Peracetic Acid in Glacial Acetic Acid Solution." *Journal American Chemistry Society,* vol. 67(1945), pp. 412-414.
Gast, L.E., et al. "Polyesteramides from linseed and soybean oils for protective coatings: Diisocyanate-modified polymers." Journal of the American Oil Chemists' Society, vol. 46, No. 7, Jul. 1969. Web. Jul. 8, 2009.

* cited by examiner

*Primary Examiner* — Randy Gulakowski
*Assistant Examiner* — Jeffrey Washville
(74) *Attorney, Agent, or Firm* — John C. McMahon

(57) ABSTRACT

Methods of one-pot synthesis of high molecular weight natural oil polyols having a functionality of at least two are provided. The resultant polyols may be directly reacted with polyisocyanates to produce polyurethanes.

16 Claims, No Drawings

METHOD FOR PROVIDING HIGHER MOLECULAR WEIGHT NATURAL OIL POLYOLS WITHOUT LOSS OF FUNCTIONALITY

RELATED APPLICATIONS

This application claims benefit of U.S. Provisional Application No. 61/335,439, filed Jan. 7, 2010, and is a continuation-in-part of U.S. patent application Ser. No. 12/927,086, filed Nov. 5, 2010, the disclosures of which are hereby expressly incorporated by reference in its entirety and is hereby expressly made a portion of this application.

BACKGROUND OF THE INVENTION

The present application relates to methods of conversion of plant oils into high molecular weight natural plant oil polyols that can be used as raw materials in the manufacture of polyurethanes.

The manufacture of polyurethanes from polyisocyanates requires readily available coreactants. These coreactant materials are known in the art as polyols. Polyols may be defined as reactive substances, usually liquids, that contain at least two isocyanate-reacting groups attached to a single molecule. Such isocyanate reacting groups are also known as "active hydrogen" groups as they typically give a hydrogen atom to the isocyanate nitrogen to form a urethane. For example, an alcohol group includes an active hydrogen and reacts with isocyanate to form a urethane as shown below:

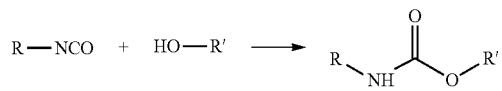

Billions of pounds of polyols are used each year to manufacture polyurethanes. Most of these polyols are polyether polyols derived from fossil fuels, typically polyethylene oxide or polypropylene oxide based polyols. As the price of oil has increased, so has the price of polyether polyols. Therefore, it has become more desirable to explore alternative sources of polyols, including agriculturally derived products such as plant oils.

Plant oils are primary metabolites of many higher plants that are economically important as sources of food and industrial oils. Chemically, plant oils are triglycerides of mixtures of fatty acids. Typically, they contain some unsaturated fatty acids. Soybean oil, for example, contains about 54 wt. % linoleic acid, 23 wt. % oleic acid, 10 wt. % palmitic acid, 8 wt. % linolenic acid and 5 wt. % stearic acid. On average, soybean oil contains 4.65 sites of unsaturation (olefin groups, carbon-carbon double bonds) per molecule. If active hydrogen functional groups, such as alcohols, are introduced into the molecule of plant oil, the product can be used as a polyol to make polyurethane.

Many plant oils, such as corn oil, soybean oil, rapeseed oil, sunflower oil, peanut oil, safflower oil, olive oil, and cotton seed oil exist in abundant supply. This abundance could yield low cost polyols if the plant oils could be functionalized with active hydrogen groups, such as alcohols, without the problems inherent in the epoxide synthetic pathway currently used in the production of most plant polyols. For example, many of the commercially available polyols made from soybean oil are manufactured in a two step process beginning with the epoxidation of soybean oil. Such process is well known in the art, and may be shown as follows:

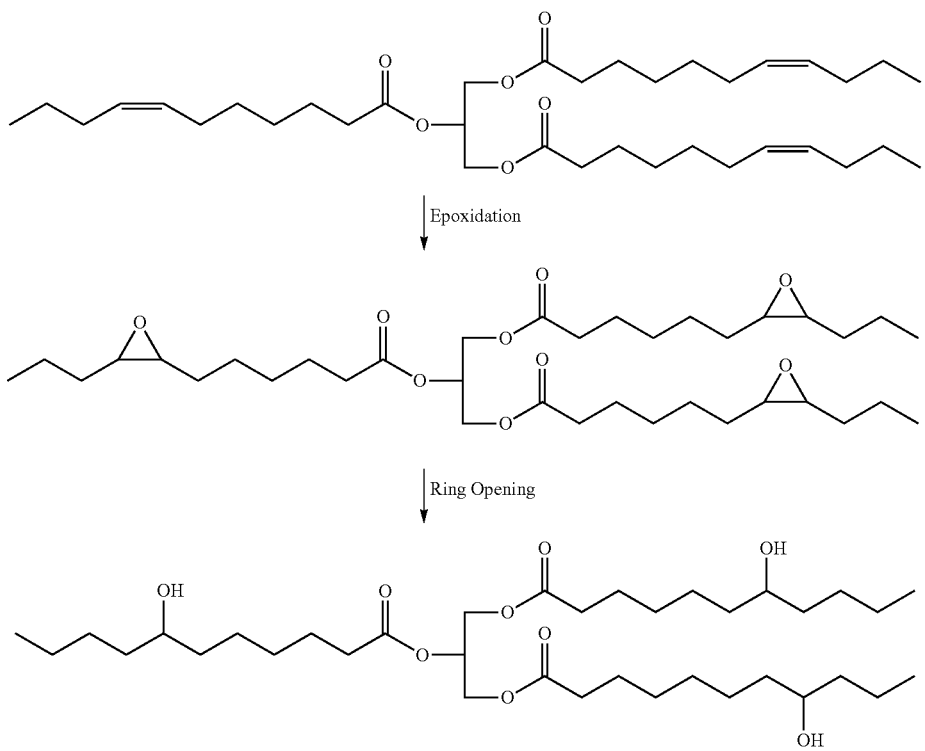

In the above-identified pathway, hydroxyl groups are introduced onto the molecule of soybean oil in the second process step by opening the oxirane of epoxidized soybean oil to form soy polyol. This may be accomplished in a variety of ways. For example, U.S. Pat. No. 2,882,249 describes the soy polyol formed by ring opening epoxidized soybean oil with ricinoleic acid. U.S. Pat. No. 4,025,477 describes the soy polyol obtained by ring opening epoxidized soybean oil with acrylic acid. U.S. Pat. Nos. 5,266,714 and 5,302,626 describe soy polyols obtained by ring opening epoxidized soybean oil with carboxylic acids. U.S. Pat. No. 6,891,053 describes the soy polyol obtained by ring opening epoxidized soybean oil with acid leached clay. U.S. Pat. Nos. 4,508,853 and 4,742,087 describe the soy polyol obtained by ring opening epoxidized soybean oil with alcohols. U.S. Pat. Nos. 6,433,125 and 4,551,517 describe soy polyols obtained by ring opening epoxidized soybean oil with higher alcohols. U.S. Pat. No. 4,886,893 describes the soy polyol obtained by ring opening epoxidized soybean oil with polyfunctional alcohols. U.S. Pat. Nos. 6,107,433, 6,433,121, 6,573,354 and 6,686,435 describe the soy polyols obtained by ring opening epoxidized soybean oil with a mixture of water, alcohol and fluoroboric acid.

Epoxidized soybean oils used to manufacture soy polyols typically have epoxide numbers of from about 4.8 to about 7.2. If the epoxide number of epoxidized soybean oil is too low, the hydroxylation reaction will give a soy polyol that contains an undesirable concentration of by-products having zero and mono hydroxy group molecules. Soy polyol containing zero and mono hydroxyl group molecules result in polyurethanes with poor physical properties. If the epoxide number of the epoxidized soybean oil is too high, the hydroxylation reaction will produce a soy polyol product that contains an undesirably large concentration of by-product having intramolecular cross-linked molecules. High concentrations of by-products containing intramolecular cross-linking unacceptably increases the viscosity of the soy polyols as well as detrimentally affecting the physical properties of the polyurethane products. It is known in the art that ring opening, for example, via hydroxylation of epoxidized plant oils, results in a variety of complex by-products, including, but not limited to intra-molecular cross-linked by-products, intermolecular cross-linked by-products, hydrolysis by-products and alcohol exchange by-products. Furthermore, even the expected or planned products of epoxidized plant oils may be poor reactors, such as secondary hydroxyl groups in the middle of fatty acid chains, which may be high in stearic hindrance.

Currently, manufacturers seeking to use plant oil polyols, such as soybean oil-derived polyols, to produce polyurethane, often must choose between inexpensive, high viscosity raw materials that are dark in color or, alternatively, expensive, low viscosity and lighter colored materials. Products from both materials may have poor physical properties that limit market acceptance. Furthermore, such poor properties may limit the overall percentage in which such materials are added to polyurethane formulations. For many uses, preferably, a plant polyol reactant would be a low cost, low viscosity and light colored raw material comparable to certain materials derived from fossil fuels. However, because of the problems inherent in the current art, such physical properties are not possible with the currently available technology at the price point desired by the market.

It is noted that it is known in the art to hydroxylate hydrocarbons by biological methods. However, to date, such processes have not proven economical in the quantities required by the market. Also, some plant oils can be used as polyols without modification. For example, castor oil contains on average about 2.7 hydroxyl groups per molecule. However, the supply of castor oil is limited and properties of polyurethanes made from such polyols (such as resilience) are not equal to those of fossil fuel derived materials.

Certain polyols may be derived from plant sources. For example polytetramethylene glycol (PTMEG) is derived from polymerizing tetrahydrofuran (THF) from corn. Such polyols yield polyurethanes with excellent physical properties and are thus superior raw materials. However, to date, the high cost of producing such polyols has resulted in limited market acceptance.

It is noted that Gast et al., U.S. Pat. No. 3,485,779 (hereafter the '779 patent) discloses reactions of hydroxylamines with triglycerides. Specifically that linseed and soybean N,N-bis-hydroxyalkyl fatty amides can be obtained by a strong base sodium methoxide catalyzed aminolysis of linseed oil and soybean oil. Such a reaction may be set forth as follows:

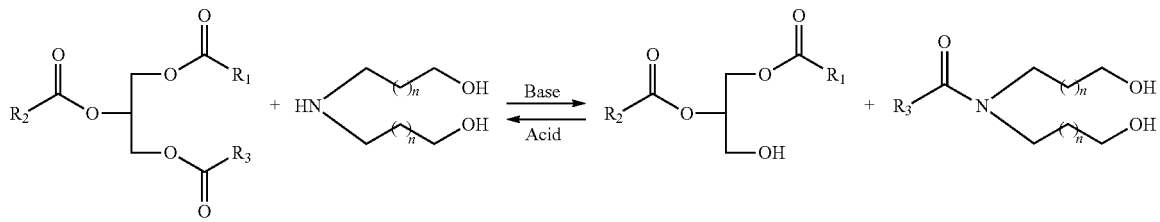

It is further noted that the '779 patent reports that reactions of that invention are inhibited by HX, thus teaching against the invention of the present application that teaches the use of HX as a catalyst in certain embodiments.

Schneider et al., U.S. Pat. No. 4,094,838 (hereafter the '838 patent) discloses soybean N,N,-bis-hydroxy ethyl fatty amide that can be used to make water-dispersible polyurethane coatings as a small molecule polyol of polyurethane resin. The '838 patent teaches diethanolamine as a preferred amidating agent in a base catalyzed aminolysis. The preferred catalyst being sodium methoxide.

SUMMARY OF THE INVENTION

In a first embodiment, a process of synthesizing a high molecular weight natural oil polyol with a functionality of at least two in a single reaction vessel, including the steps of forming a mixture including plant oil based unsaturated triglyceride, a catalyst, a tri-functional chain extender and a di-functional coupling reagent; and reacting the mixture at a temperature of from about 70° F. to about 310° F. while simultaneously removing water from the mixture for a period of time of at least three hours, so as to form a plant oil based polyol product with a functionality of at least 2, is provided.

In a further embodiment, removing water from the mixture includes refluxing the mixture over a Dean-Stark trap. In a further embodiment, removing water from the mixture includes reacting the mixture under a vacuum.

In a further embodiment, the period of time is in a range of from 3-hours to about 24-hours.

In a further embodiment, the tri-functional chain extender is selected from the group consisting of small molecular weight polyol and polyamines having three or more active hydrogen functional groups, and combinations thereof. In a still further embodiment, the tri-functional chain extender is selected from the group consisting of trimethanylolethane, glycerin, triethanolamine and combinations thereof.

In some embodiments, the di-functional coupling reagent is selected from the group consisting of dicarboxylic acids, dicarboxylic anhydrides, and combinations thereof. In a still further embodiment, the di-functional coupling reagent is selected from the group consisting of maleic acid, maleic anhydride, succinic acid, succinic anhydride, glutaric acid, glutaric anhydride, phthalic acid, phthalic anhydride, fumaric acid, adipic acid, and combinations thereof.

In a further embodiment, the catalyst is selected from the group consisting of organic acids and inorganic acids, and combinations thereof. In a still further embodiment, the catalyst is selected from the group consisting of p-toluenesulfonic acid, methanesulfonic acid, sulfuric acid and phosphoric acid, and combinations thereof.

In a further embodiment, the plant oil based unsaturated triglyceride is selected from the group consisting of a corn oil, soybean oil, rapeseed oil, sunflower oil, sesame seed oil, peanut oil, safflower oil, olive oil, cotton seed oil, linseed oil, walnut oil, tung oil and combinations thereof. In a still further embodiment, the plant oil based unsaturated triglyceride is a soybean oil.

In a second embodiment, a high molecular weight plant oil based polyol with a functionality of at least 2 produced by the steps of forming a mixture including plant oil based unsaturated triglyceride, a catalyst, a tri-functional chain extender and a di-functional coupling reagent; and reacting the mixture at a temperature of from about 70° F. to about 280° F. while simultaneously removing water from the mixture for a period of time of at least three hours, so as to form a plant oil based polyol product with a functionality of at least 2, is provided.

In a further embodiment, the polyol is a soybean oil based polyol.

In a third embodiment, a process of preparing a polyurethane, including the steps of reacting at least one plant oil based polyol with a functionality of at least 2 and produced by the steps of forming a mixture including plant oil based unsaturated triglyceride, a catalyst, a tri-functional chain extender and a di-functional coupling reagent; and reacting the mixture at a temperature of from about 70° F. to about 280° F. while simultaneously removing water from the mixture for a period of time of at least three hours, so as to form a plant oil based polyol product with a functionality of at least 2, with at least one of an aromatic isocyanate, an aliphatic isocyanate and an isocyanate terminated pre-polymer, so as to form a polyurethane, is provided.

In a fourth embodiment, a polyurethane according to a process of preparing a polyurethane, including the steps of reacting at least one plant oil based polyol with a functionality of at least 2 and produced by the steps of forming a mixture including plant oil based unsaturated triglyceride, a catalyst, a tri-functional chain extender and a di-functional coupling reagent; and reacting the mixture at a temperature of from about 70° F. to about 280° F. while simultaneously removing water from the mixture for a period of time of at least three hours, so as to form a plant oil based polyol product with a functionality of at least 2, with at least one of an aromatic isocyanate, an aliphatic isocyanate and an isocyanate terminated pre-polymer, so as to form a polyurethane, is provided.

OBJECTS OF THE INVENTION

Not all objects apply to all embodiments. One object of the present invention is to provide a method of coupling renewable plant oil based polyols, so as to produce a higher molecular weight polyol that subsequently can be used for the synthesis of bio-based or plant oil based polyurethanes. Another object of the present invention is to provide low cost bio-based polyols with increased reactivity, lower color and less steric hindrance than other polyols.

Other objects and advantages of this invention will become apparent from the following description that sets forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention.

It is believed the chemistry disclosed in the present application can be applied to synthetic oils, fossil fuel and derived oils, and oils from genetically engineered plants, as well as naturally occurring plant oils and blends of any of the above oils, as long as such oils include carbon-carbon double bonds on which to carry out the reaction. Also, homologue derivatives of plant polyols according to the invention are possible. For example, polyols of the invention may be ethoxylated or propoxylated to further resemble fossil fuel polyols.

Plant oil based polyols, or natural oil or plant oil polyols, can be coupled or joined together, so as to synthesize a natural oil polyol having a high molecular weight, known in the art as a low hydroxyl value or number. Preferably, the molecular weight of the high molecular weight, or coupled, polyol is greater than about 800, and more preferably in a range of about 2,000 to about 20,000, and the hydroxyl value (OH#) is 150 or less.

In an embodiment according to the invention, a process of coupling plant oil based polyols to produce a high molecular weight natural oil polyol product is provided, including the steps of forming a mixture of a plant oil based polyol reagent and a coupling reagent; and then reacting the mixture at a temperature of from about 100° F. to about 250° F. while simultaneously removing water from the mixture for a period of from about 3-hours to about 24-hours or more, so as to form a high molecular weight plant oil polyol product with a hydroxyl number, or hydroxyl value, of between about 50 and 60. In some embodiments, the high molecular weight natural oil polyol includes a hydroxyl number of between about 50 and 60.

The coupling reaction is reversible. Further, water is one of the reaction products. In order to drive the reaction towards completion of the coupling reaction, the water is removed while the reaction is proceeding. This can be done using a variety of methods known in the art. For example, the water may be removed from the mixture by refluxing the mixture over a Dean-Stark trap. In another example, the water may be removed from the mixture by reacting the mixture under a vacuum, as the hot reaction makes the water easily volatile, especially in a vacuum. Additional suitable methods are known in the art.

Numerous natural plant oil, or plant oil based, polyols are suitable polyol reagents for the synthesis of the high molecular weight plant oil polyol, including but not limited to corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof.

In one embodiment, the high molecular weight natural plant oil polyol includes a soybean oil based polyol reagent having a hydroxyl value (OH#), or hydroxyl number, of 150. In another embodiment, the soybean oil based polyol reagent has a hydroxyl value (OH#) of less than 150.

The polyol reagent may be synthesized using any method disclosed herein. In preferred embodiments, the polyol reagent is a soybean oil based polyol synthesized in one step, according to the reaction scheme described above. After synthesis, the plant oil polyols, or the polyol reagent, are coupled together using a coupling reagent, according to the reaction scheme I, below:

phatic dicarboxylic acid or an aromatic dicarboxylic acid, or a di- or tricarboxylic free acid. When the coupling reagent is a dicarboxylic or polycarboxylic acid, or an anhydride thereof, the high molecular weight polyol produced is a polyester polyol.

Some exemplary dicarboxylic acid anhydride coupling reagents include but are not limited to ethanedioic acid anhydride, propanedioic acid anhydride, butanedioic acid anhydride, pentanedioic acid anhydride, hexanedioic acid anhydride, heptanedioic acid anhydride, octanedioic acid anhydride, nonanedioic acid anhydride, decanedioic acid anhydride, benzene-1,2-dicarboxylic acid anhydride, o-phthalic acid benzene-1,3-dicarboxylic acid anhydride, m-phthalic acid benzene-1,4-dicarboxylic acid anhydride, p-phthalic acid anhydride, and combinations thereof.

In some other embodiments, the coupling reagent is a poly-alcohol. For example, coupling reagent may be a diol, a triol, a qaurtol, and combinations thereof. When the coupling reagent is a poly-alcohol, the high molecular weight polyol produced is an ether polyol.

The coupling reaction is acid catalyzed. Thus, the coupling reaction is performed in the presence of an acid. Suitable acid catalysts include, but are not limited to, phosphoric acid, sulfuric acid, p-toluensulfonic acid and methanesulfonic acid.

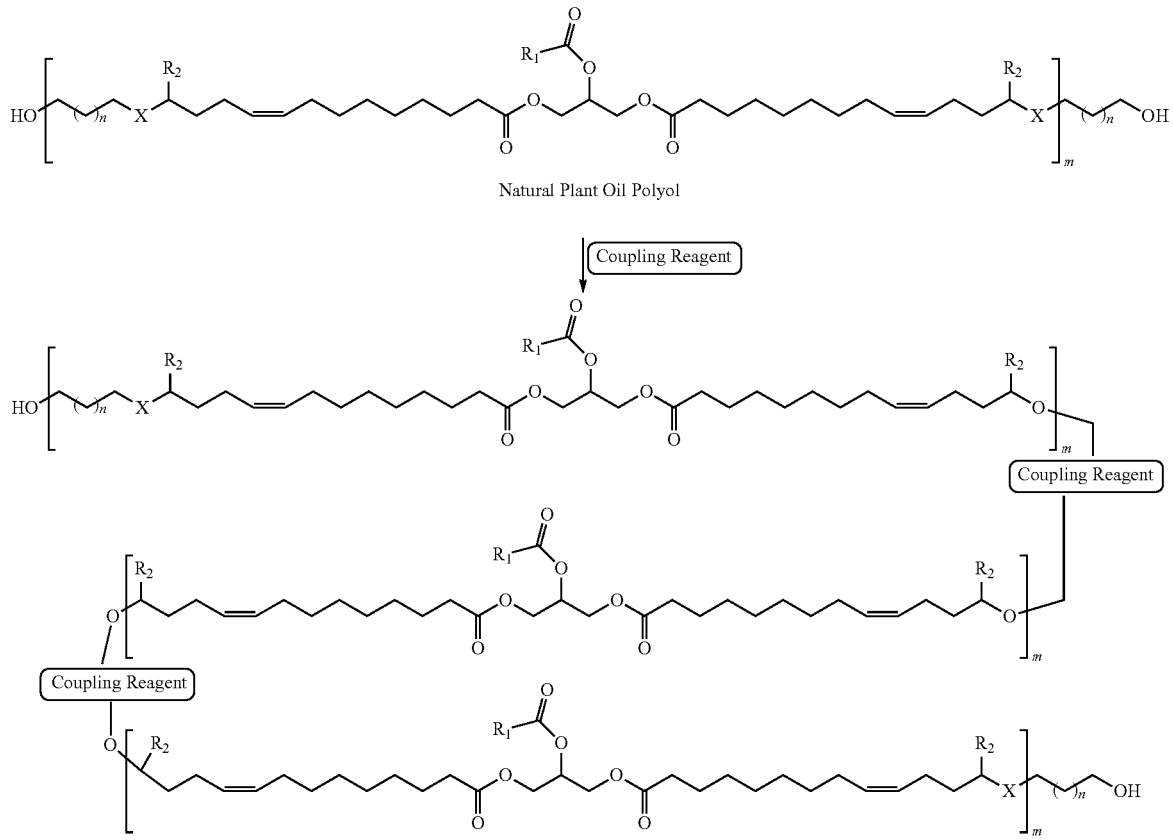

Numerous coupling reagents, agents or reactants may be used. In some embodiments, the coupling reagent is a carboxylic acid free acid or an anhydride of the acid. For example, the coupling reagent may be a dicarboxylic acid, a polycarboxylic acid, such as a tricarboxylic acid, or a combination thereof. In other examples, the coupling reagent may be an anhydride of the dicarboxylic or polycarboxylic acid. Preferably, the coupling reagent is an anhydride of an ali- The coupling reaction is performed under vacuum and at a temperature of about 100° F., 105° F., 110° F., 115° F., 120° F., 125° F., 130° F., 135° F., 140° F., 145° F., 150° F., 155° F., 160° F., 165° F., 170° F., 175° F., 180° F., 185° F., 190° F., 195° F., 200° F., 205° F., 210° F., 215° F., 220° F., 225° F., 230° F., 235° F., 240° F., 245° F., 250° F., 255° F. or higher. In some circumstances, the reaction temperature is optimized for at least one of the reaction components, the reaction volume, and the reaction vessel. In some circumstances, the reaction is performed under a nitrogen gas blanket.

The coupling reaction is performed for a period of from about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13., 13.5, 14, 14.5, 15, 15.5, 16, 16.5, 17, 17.5, 18, 18.5, 19, 19.5, 20, 20.5, 21, 21.5, 22, 22.5, 23, 23.5, or 24-hours or longer. In some circumstances, the reaction time is optimized for at least one of the reaction components, the reaction volume, and the reaction vessel. For example, longer reactions times, such as but not limited to 1, 2, 3, 4, 5, 6, 7, 8, 9, 10, 11, 12, 13, or 14-days may be required for larger-scale or industrial-scale reaction volumes, such as is known in the art.

In some embodiments, additional processing of the reaction mixture improves the amount and/or quality of the reaction product. For example, in some circumstances, the reaction mixture may be refluxed, extracted, distilled or the like.

In preferred embodiments, the coupled plant oil polyols may be used to synthesize plant oil based polyurethanes, such as is described elsewhere herein. Often, coupled plant oil polyol is a soybean oil based coupled polyol, wherein the polyol(s) has a hydroxyl number of from about 50 to about 60. For example, suitable soybean oil based polyols for use in the coupling reaction have a hydroxyl number of about 50, 51, 52, 53, 54, 55, 56, 57, 58, 59 or 60.

The following examples of compositions according to the invention are provided for illustration. Any parts and percentages are by weight of the composition unless otherwise indicated.

Example 1

| Component | Amount (grams) |
| --- | --- |
| Soybean oil | 99.79 |
| Iodine | 0.17 |
| Diethanolamine | 10.78 |
| Maleic anhydride | 9.15 |
| Phosphorus pentoxide | 0.10 |
| Diphenylmethane diisocyanate | 2.70 |

The above amounts of diethanolamine and iodine were added to the above amount of soybean oil with stirring. The mixture was stirred for 23 hours at a temperature between about 195° F. (90° C.) and about 236° F. (113° C.). Then the above amounts of maleic anhydride and phosphorus pentoxide were added. The mixture was stirred for 22 hours at between about 195° F. (90° C.) and about 236° F. (113° C.) and under vacuum, then cooled to room temperature to give about 119.90 grams clear liquid soybean oil-polyol with a hydroxyl number of 58. An amount of 20.00 grams of the reaction product was then reacted with the above disclosed amount of diphenylmethane diisocyanate, yielding a solid polyurethane material based upon soybean oil.

Example 2

| Component | Amount (grams) |
| --- | --- |
| Soybean oil | 129.86 |
| Iodine | 0.23 |
| Diethanolamine | 14.03 |
| Maleic anhydride | 15.72 |
| Phosphoric acid | 0.16 |
| Diphenylmethane diisocyanate | 00.90 |

The above amounts of diethanolamine and iodine were added to the above amount of soybean oil with stirring. The mixture was stirred for 24 hours at a temperature between about 120° F. and about 225° F. Then, the above amounts of maleic anhydride and phosphoric acid were added with stirring. The second mixture was stirred for 22 hours under vacuum, at a temperature between about 120° F. and about 225° F., then cooled to room temperature to give a liquid soy polyol with a hydroxyl number of 38. A reaction mixture of about 10.00 grams of the soybean oil based polyol with the above amount of diphenylmethane diisocyanate yielded a solid soybean oil based polyurethane material.

Example 3

| Component | Amount (grams) |
| --- | --- |
| Soybean oil | 132.89 |
| Iodine crystal | 0.23 |
| Diethanolamine | 14.36 |
| Maleic anhydride | 12.36 |
| Phosphoric acid | 0.16 |
| Diphenylmethane diisocyanate | 1.35 |

The above amounts of diethanolamine and iodine were added to the above amount of soybean oil with stirring. The mixture was stirred for 23 hours at a temperature between about 190° F. and about 226° F. Then, the above amounts of maleic anhydride and phosphoric acid were added with stirring. The mixture was stirred under vacuum for 24 hours at between about 190° F. and about 226° F. to give a liquid soybean oil based polyol with a hydroxyl number of 57. A reaction mixture of about 10.00 grams of the polyol and the above indicated amount of diphenylmethane diisocyanate yielded a solid soybean oil based polyurethane material.

Example 4

| Component | Amount (grams) |
| --- | --- |
| Soybean oil | 116.16 |
| Iodine crystal | 0.20 |
| Diethanolamine | 12.55 |
| Maleic anhydride | 10.97 |
| Phosphoric acid | 0.16 |
| Diphenylmethane diisocyanate | 1.30 |

The above amounts of diethanolamine and iodine were added to the above amount of soybean oil with stirring. The mixture was stirred for 23 hours at a temperature between about 180° F. and about 225° F. Then, the above amounts of maleic anhydride and phosphoric acid were added with stirring. The mixture was stirred under vacuum for 23 hours at between about 190° F. and about 226° F. to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

Example 5

| Component | Amount (grams) |
| --- | --- |
| Soybean oil | 124.64 |
| Iodine crystal | 0.22 |
| Diethanolamine | 13.47 |
| Maleic anhydride | 21.56 |
| Toluene | 200.00 |
| Sulfuric acid | 0.12 |
| Diphenylmethane diisocyanate | 1.26 |

The above amounts of diethanolamine and iodine were added to the above amount of soybean oil with stirring. The mixture was stirred for 22 hours at a temperature between about 180° F. and about 225° F. Then, the above amounts of maleic anhydride, toluene and sulfuric acid were added with stirring. The mixture was refluxed for 6 hours using a Dean-Stark distilling trap, then distilled out of solvent to give a liquid soybean oil based polyol with a hydroxyl number of 50. A reaction mixture of about 10.00 grams of the polyol and the above indicated amount of diphenylmethane diisocyanate yielded a solid soybean oil based polyurethane material.

Example 6

| Component | Amount (grams) |
| --- | --- |
| Soybean oil | 124.18 |
| Iodine crystal | 0.22 |
| Diethanolamine | 13.42 |
| Maleic anhydride | 12.03 |
| Toluene | 200.00 |
| Phosphoric acid | 0.15 |
| Diphenylmethane diisocyanate | 1.28 |

The above amounts of diethanolamine and iodine were added to the above amount of soybean oil with stirring. The mixture was stirred for 23 hours at a temperature between about 180° F. and about 227° F. Then, the above amounts of maleic anhydride, toluene and phosphoric acid were added with stirring. The mixture was refluxed for 8 hours using a Dean-Stark distilling trap, then distilled out of solvent to give a liquid soybean oil based polyol with a hydroxyl number of 52. A reaction mixture of about 10.00 grams of the polyol and the above indicated amount of diphenylmethane diisocyanate yielded a solid soybean oil based polyurethane material.

Example 7

| Component | Amount (grams) |
| --- | --- |
| Soybean oil | 132.75 |
| Iodine crystal | 0.23 |
| Diethanolamine | 14.35 |
| Maleic anhydride | 12.54 |
| Phosphoric acid | 0.13 |
| Diphenylmethane diisocyanate | 1.32 |

The above amounts of diethanolamine and iodine were added to the above amount of soybean oil with stirring. The mixture was stirred for 24 hours at a temperature between about 190° F. and about 225° F. Then, the above amounts of maleic anhydride and phosphoric acid were added with stirring. The mixture was stirred for 10 hours at a temperature of about 240° F. under vacuum to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

Example 8

| Component | Amount (grams) |
| --- | --- |
| Soybean oil | 149.34 |
| Iodine crystal | 0.26 |
| Diethanolamine | 16.14 |
| Maleic anhydride | 14.11 |
| Phosphoric acid | 0.15 |
| Diphenylmethane diisocyanate | 1.30 |

The above amounts of diethanolamine and iodine were added to the above amount of soybean oil with stirring. The mixture was stirred for 24 hours at a temperature between about 190° F. and about 225° F. Then, the above amounts of maleic anhydride and phosphoric acid were added with stirring. The mixture was stirred for 5 hours at a temperature of about 255° F. under vacuum to give a liquid soybean oil based polyol with a hydroxyl number of 52. A reaction mixture of about 10.00 grams of the polyol and the above indicated amount of diphenylmethane diisocyanate yielded a solid soybean oil based polyurethane material.

Example 9

| Component | Amount (grams) |
| --- | --- |
| Soybean oil | 165.98 |
| Iodine crystal | 0.29 |
| Diethanolamine | 17.94 |
| Maleic anhydride | 15.68 |
| Phosphoric acid | 0.11 |
| Diphenylmethane diisocyanate | 1.29 |

The above amounts of diethanolamine and iodine were added to the above amount of soybean oil with stirring. The mixture was stirred for 24 hours at a temperature between about 190° F. and about 226° F. Then, the above amounts of maleic anhydride and phosphoric acid were added with stirring. The mixture was stirred for 4 hours at a temperature of about 240° F. under vacuum to give a liquid soybean oil based polyol with a hydroxyl number of 51. A reaction mixture of about 10.00 grams of the polyol and the above indicated amount of diphenylmethane diisocyanate yielded a solid soybean oil based polyurethane material.

Example 10

| Component | Amount (grams) |
| --- | --- |
| Soybean oil | 165.98 |
| Iodine crystal | 0.29 |
| Diethanolamine | 17.94 |
| Maleic anhydride | 15.68 |
| Phosphoric acid | 0.11 |
| Diphenylmethane diisocyanate | 1.29 |

The above amounts of diethanolamine and iodine were added to the above amount of soybean oil with stirring. The mixture was stirred for 24 hours at a temperature between about 190° F. and about 226° F. Then, the above amounts of maleic anhydride and phosphoric acid were added with stirring. The mixture was stirred for 4 hours at a temperature of about 240° F. under vacuum to give a liquid soybean oil based polyol with a hydroxyl number of 51. A reaction mixture of about 10.00 grams of the polyol and the above indicated amount of diphenylmethane diisocyanate yielded a solid soybean oil based polyurethane material.

Example 11

| Component | Amount (grams) |
| --- | --- |
| Soybean oil | 125.32 |
| Iodine crystal | 0.23 |
| Diethanolamine | 17.45 |
| Maleic anhydride | 16.89 |
| Phosphoric acid | 0.12 |
| Diphenylmethane diisocyanate | 1.28 |

The above amounts of diethanolamine and iodine were added to the above amount of soybean oil with stirring. The mixture was stirred for 24 hours at a temperature between about 200° F. and about 227° F. Then, the above amounts of maleic anhydride and phosphoric acid were added with stirring. The mixture was stirred for 24 hours at a temperature between about 200° F. and about 227° F. under vacuum to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

Example 12

| Component | Amount (grams) |
| --- | --- |
| Soybean oil | 140.99 |
| Iodine crystal | 0.25 |
| Diethanolamine | 17.45 |
| Maleic anhydride | 19.00 |
| Toluene | 200.00 |
| Sulphuric acid | 0.13 |
| Diphenylmethane diisocyanate | 1.25 |

The above amounts of diethanolamine and iodine were added to the above amount of soybean oil with stirring. The mixture was stirred for 22 hours at a temperature between about 180° F. and about 225° F. Then, the above amounts of maleic anhydride, toluene and sulfuric acid were added with stirring. The mixture was refluxed for 8 hours using a Dean-Stark distilling trap, then distilled out of solvent to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

Example 13

| Component | Amount (grams) |
| --- | --- |
| Soybean oil | 148.76 |
| Iodine crystal | 0.27 |
| Diethanolamine | 20.71 |
| Maleic anhydride | 20.05 |
| Toluene | 200.00 |
| p-Toluenesulphonic acid | 0.22 |
| Diphenylmethane diisocyanate | 1.24 |

The above amounts of diethanolamine and iodine were added to the above amount of soybean oil with stirring. The mixture was stirred for 22 hours at a temperature between about 180° F. and about 228° F. Then, the above amounts of maleic anhydride, toluene and p-toluenesulphonic acid were added with stirring. The mixture was refluxed for 10 hours using a Dean-Stark distilling trap, then distilled out of solvent to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

Example 14

| Component | Amount (grams) |
| --- | --- |
| Soybean oil | 157.99 |
| Iodine crystal | 0.28 |
| Diethanolamine | 17.07 |
| Maleic anhydride | 14.48 |
| p-Toluenesulphonic acid | 0.18 |
| Diphenylmethane diisocyanate | 1.26 |

The above amounts of diethanolamine and iodine were added to the above amount of soybean oil with stirring. The mixture was stirred for 24 hours at a temperature between about 200° F. and about 226° F. Then, the above amounts of maleic anhydride and p-toluenesulphonic acid were added with stirring. The mixture was stirred under vacuum for 20 hours at a temperature between about 200° F. and about 226° F. to give a liquid soybean oil based polyol with a hydroxyl number of 55. A reaction mixture of about 10.00 grams of the polyol and the above indicated amount of diphenylmethane diisocyanate yielded a solid soybean oil based polyurethane material.

Example 15

| Component | Amount (grams) |
| --- | --- |
| Soybean oil | 164.23 |
| Iodine crystal | 0.29 |
| Diethanolamine | 17.75 |
| Maleic anhydride | 16.57 |
| Methylpropane diol | 0.97 |
| Phosphoric acid | 0.20 |
| Diphenylmethane diisocyanate | 1.25 |

The above amounts of diethanolamine and iodine were added to the above amount of soybean oil with stirring. The mixture was stirred for 23 hours at a temperature between about 200° F. and about 226° F. Then, the above amounts of maleic anhydride, methylpropane diol, and phosphoric acid were added with stirring. The mixture was stirred under vacuum for 8 hours at a temperature between about 200° F. and about 230° F. to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

Example 16

| Component | Amount (grams) |
| --- | --- |
| Soybean oil | 172.52 |
| Iodine crystal | 0.30 |
| Diethanolamine | 18.64 |
| Maleic anhydride | 17.40 |
| Methylpropane diol | 1.02 |
| Phosphoric acid | 0.12 |
| Diphenylmethane diisocyanate | 1.25 |

The above amounts of diethanolamine and iodine were added to the above amount of soybean oil with stirring. The mixture was stirred for 23 hours at a temperature between about 200° F. and about 227° F. Then, the above amounts of maleic anhydride, methylpropane diol, and phosphoric acid were added with stirring. The mixture was stirred under vacuum for 5 hours at a temperature between about 200° F. and about 235° F. to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

Example 17

| Component | Amount (grams) |
| --- | --- |
| Soybean oil | 160.73 |
| Iodine crystal | 0.28 |
| Diethanolamine | 17.37 |
| Maleic anhydride | 18.13 |
| Diethylene glycol | 3.19 |
| P-Toluenesulfonic acid | 0.30 |
| Diphenylmethane diisocyanate | 1.26 |

The above amounts of diethanolamine and iodine were added to the above amount of soybean oil with stirring. The mixture was stirred for 23 hours at a temperature between about 210° F. and about 226° F. Then, the above amounts of maleic anhydride, diethylene glycol, and p-toluenesulfonic acid were added with stirring. The mixture was stirred under vacuum for 8 hours at a temperature between about 210° F. and about 230° F. to give a liquid soybean oil based polyol with a hydroxyl number of 55. A reaction mixture of about 10.00 grams of the polyol and the above indicated amount of diphenylmethane diisocyanate yielded a solid soybean oil based polyurethane material.

Example 18

| Component | Amount (grams) |
| --- | --- |
| Soybean oil | 163.60 |
| Iodine crystal | 0.29 |
| Diethanolamine | 17.68 |
| Maleic anhydride | 16.50 |
| Diethylene glycol | 1.62 |
| P-Toluenesulfonic acid | 0.31 |
| Diphenylmethane diisocyanate | 1.25 |

The above amounts of diethanolamine and iodine were added to the above amount of soybean oil with stirring. The mixture was stirred for 23 hours at a temperature between about 210° F. and about 225° F. Then, the above amounts of maleic anhydride, diethylene glycol, and p-toluenesulfonic acid were added with stirring. The mixture was stirred under vacuum for 5 hours at a temperature between about 215° F. and about 235° F. to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

In another embodiment according to the invention, a process of synthesizing, in a single reaction vessel, a high molecular weight natural oil polyol with a functionality of at least two, from a plant oil by direct addition of, for example, diethanolamine onto the unsaturated chains of the plant oil triglycerides, followed by coupling and chain extension reactions is provided according to the reaction scheme II, below:

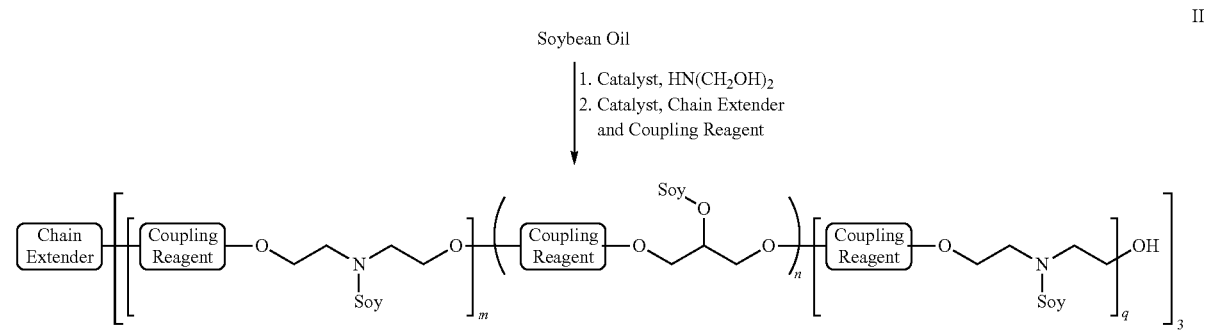

II

While transesterification and coupling reactions are well known in the literature, these techniques have not proven successful in the natural oil polyol industry. However, surprisingly, the present invention provides reaction conditions for both coupling and chain extension to proceed simultaneously while generating few by-products. While low molecular weight chain extenders are typically used in chain extension reactions to increase molecular weight or crosslink density, in the present invention the use of such low molecular weight chain extenders eliminates the loss of functionality upon coupling.

The advantages of this new method can be seen in the table below:

| Coupling Method | Functionality | Equivalent Weight |
| --- | --- | --- |
| Without chain extender | >1.7 | 1200 g/mol |
| With chain extender | >2.8 | 1200 g/mol |

Accordingly, the process of synthesizing the high molecular weight natural oil polyol with a functionality of at least two in a single reaction vessel includes the steps of forming a mixture including plant oil unsaturated triglyceride, a catalyst, a tri-functional chain extender and a di-functional coupling reagent; and then reacting the mixture at a temperature of from about 70° F. to about 300° F. while simultaneously removing water from the mixture for a period of time of at least three hours, so as to form a plant oil based polyol product with a functionality of at least 2.

In some embodiments, the reaction is performed at a temperature of about 150° F., 155° F., 160° F., 165° F., 170° F., 175° F., 180° F., 185° F., 190° F., 195° F., 200° F., 205° F., 210° F., 215° F., 220° F., 225° F., 230° F., 235° F., 240° F., 245° F., 250° F., 255° F., 260° F. 265° F., 270° F., 275° F., 280° F., 285° F., 290° F., 295° F., 300° F. or higher. In some embodiments, lower reaction temperatures may be used, such as a temperature of about room temperature up to about 125° F. In some circumstances, the reaction temperature is optimized for at least one of the reaction components, the reaction volume, and the reaction vessel. In some circumstances, the reaction is performed under a nitrogen gas blanket.

In some embodiments, the reaction is allowed to proceed for period of time of about 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5 or 24-hours or longer. In some embodiments, the reaction is performed for a period of from about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13., 13.5, 14, 14.5, 15, 15.5, 16, 16.5, 17, 17.5, 18, 18.5, 19, 19.5, 20, 20.5, 21, 21.5, 22, 22.5, 23, 23.5, or 24-hours or longer. In some circumstances, the reaction time is optimized for at least one of the reaction components, the reaction volume, and the reaction vessel. For example, longer reactions times, such as but not limited to 1, 2, 3, 4, 5, 6, 7, 8, 9, 10, 11, 12, 13, or 14-days may be required for larger-scale or industrial-scale reaction volumes, such as is known in the art. In another example, some catalysts cause the reaction to progress more rapidly than other catalysts. In yet another example, the reaction may progress more rapidly at an increased temperature as compared with the reaction rate at a lower temperature, such as is known in the art.

As discussed above, reversal of the coupling reaction can be blocked by removing water from the reaction, so as to drive the reaction towards completion. The water can be removed using a variety of methods known in the art. For example, the water may be removed from the mixture by refluxing the mixture over a Dean-Stark trap. In another example, the water may be removed from the mixture by reacting the mixture under a vacuum, as the hot reaction makes the water easily volatile, especially in a vacuum. Additional suitable methods are known in the art.

In some embodiments, additional processing of the reaction mixture improves the amount and/or quality of the reaction product. For example, in some circumstances, the reaction mixture may be refluxed, extracted, distilled or the like.

Numerous natural plant oils are suitable triglyceride reagents for the synthesis of the high molecular weight plant oil polyol, including but not limited to corn oil, soybean oil, rapeseed oil, sunflower oil, sesame seed oil, peanut oil, safflower oil, olive oil, cotton seed oil, linseed oil, walnut oil, tung oil and combinations thereof. In one embodiment, the plant oil based unsaturated triglyceride is a soybean oil.

Numerous tri-functional chain extenders may be selected, including but not limited to small molecular weight polyols and polyamines that have three or more active hydrogen functional groups, and combinations thereof. For example, useful tri-functional chain extenders include but are not limited to trimethanylolethane, glycerin, triethanolamine, sorbitol and combinations thereof.

Numerous di-functional coupling reagent is selected from the group consisting of dicarboxylic acids, dicarboxylic anhydrides, and combinations thereof. In an exemplary embodiment, the di-functional coupling reagent is at least one of maleic acid, maleic anhydride, succinic acid, succinic anhydride, glutaric acid, glutaric anhydride, phthalic acid, phthalic anhydride, fumaric acid, adipic acid, sorbitol and combinations thereof.

The catalyst may be an organic acid, an inorganic acid, or a combination thereof. In an exemplary embodiment, the catalyst is selected from the group consisting of p-toluenesulfonic acid, methanesulfonic acid, sulfuric acid and phosphoric acid, and combinations thereof.

The natural oil polyols obtained under the present invention using scheme II are produced under vacuum without any solvent. However, in some embodiments, if alternative reactants with decreased solubility or increased volatility are required, the polyols can be obtained from a reaction at ambient atmosphere with common organic solvents such as toluene or xylene.

In another embodiment, a high molecular weight plant oil based polyol with a functionality of at least 2 according to scheme II is provided. In a further embodiment, the polyol is a soybean oil based high molecular weight polyol a functionality of at least 2 according to scheme V.

In another embodiment, a process of preparing a polyurethane high molecular weight plant oil based polyol with a functionality of at least 2 according to scheme II is provided, including the steps of reacting at least one plant oil based polyol according to scheme V, wherein the plant oil based polyol includes a functionality of at least 2, with at least one of an aromatic isocyanate, an aliphatic isocyanate and an isocyanate terminated pre-polymer, so as to form a polyurethane product. In a further embodiment, a polyurethane according to this method is provided.

Accordingly, the natural oil polyols of this invention, according to scheme V, can be cured with aromatic isocyanates, aliphatic isocyanates, isocyanate terminated pre-polymers, and combinations thereof, to form polyurethanes, such as described elsewhere herein. While the physical properties of polyurethane resulting from the natural oil polyols of scheme II will depend on the polyols, formulation, and isocyanate used, it is expected, from the presence of high molecular weights without the loss of functionality, that larger percentage quantities may be used in formulations for flexible foams, elastomers and the like. The ability to control functionality at a given equivalent weight is a critical component in the development of the physical properties in flexible polyurethane foams and elastomers.

The following examples of compositions according to the invention are provided for illustration. Any parts and percentages are by weight of the composition unless otherwise indicated.

Example 19

| Component | Amount (grams) |
| --- | --- |
| Soybean oil | 406.01 |
| Iodine | 0.71 |
| Diethanolamine | 43.78 |
| Maleic anhydride | 44.44 |
| Glycerin | 4.53 |
| Sulfuric acid | 0.44 |
| Diphenylmethane diisocyanate | 1.32 |

The above amounts of diethanolamine and iodine were added to the above amount of soybean oil with stirring. The mixture was stirred for 23 hours at a temperature between about 195° F. (90° C.) and about 236° F. (113° C.). Then the above amounts of maleic anhydride, glycerin and sulfuric acid were added. The mixture was stirred for 24 hours at between about 195° F. (90° C.) and about 236° F. (113° C.) and under vacuum, then cooled to room temperature to give about 496.50 grams clear liquid soybean oil-polyol with a hydroxyl number of 53. An amount of 10.00 grams of the reaction product was then reacted with the above disclosed amount of diphenylmethane diisocyanate, yielding a solid polyurethane material based upon soybean oil.

Example 20

| Component | Amount (grams) |
| --- | --- |
| Soybean oil | 324.68 |
| Iodine | 0.23 |
| Diethanolamine | 35.09 |
| Maleic anhydride | 31.10 |
| Glycerin | 3.17 |
| Toluene | 300.00 |
| Phosphoric acid | 0.44 |
| Diphenylmethane diisocyanate | 1.30 |

The above amounts of diethanolamine and iodine were added to the above amount of soybean oil with stirring. The mixture was stirred for 23 hours at a temperature between about 200° F. (93.3° C.) and about 230° F. (110.0° C.). Then the above amounts of maleic anhydride, glycerin and phosphoric acid were added. The mixture was stirred for 24 hours at between about 180° F. (82.2° C.) and about 280° F. (137.8° C.) and under vacuum, then cooled to room temperature to give a clear liquid soybean oil-polyol with a hydroxyl number of 54. An amount of 10.00 grams of the reaction product was then reacted with the above disclosed amount of diphenylmethane diisocyanate, yielding a solid polyurethane material based upon soybean oil.

Example 21

| Component | Amount (grams) |
| --- | --- |
| Soybean oil | 284.10 |
| Iodine | 0.50 |
| Diethanolamine | 30.70 |
| Maleic anhydride | 31.10 |
| Glycerin | 3.17 |
| Toluene | 300.00 |
| Phosphoric acid | 0.44 |
| Diphenylmethane diisocyanate | 1.90 |

The above amounts of diethanolamine and iodine were added to the above amount of soybean oil with stirring. The mixture was stirred for 24 hours at a temperature between about 195° F. (90° C.) and about 236° F. (113° C.). Then the above amounts of maleic anhydride, glycerin and phosphoric acid were added. The mixture was refluxed over a Dean-Sark receiver for 8-hours and then distilled out of the solvent to give clear liquid soybean oil-polyol with a hydroxyl number of 55. An amount of 15.00 grams of the reaction product was then reacted with the above disclosed amount of diphenylmethane diisocyanate, yielding a solid polyurethane material based upon soybean oil.

Example 22

| Component | Amount (grams) |
| --- | --- |
| Soybean oil | 284.30 |
| Iodine | 0.49 |
| Diethanolamine | 30.51 |
| Maleic anhydride | 33.24 |
| Glycerin | 3.15 |
| Toluene | 300.00 |
| Sulfuric acid | 0.32 |
| Diphenylmethane diisocyanate | 1.20 |

The above amounts of diethanolamine and iodine were added to the above amount of soybean oil with stirring. The mixture was stirred for 24 hours at a temperature between about 195° F. (90° C.) and about 236° F. (113° C.). Then the above amounts of maleic anhydride, glycerin and phosphoric acid were added. The mixture was refluxed over a Dean-Sark receiver for 8-hours and then distilled out of the solvent to give clear liquid soybean oil-polyol with a hydroxyl number of 47. An amount of 10.00 grams of the reaction product was then reacted with the above disclosed amount of diphenylmethane diisocyanate, yielding a solid polyurethane material based upon soybean oil.

Example 23

| Component | Amount (grams) |
| --- | --- |
| Soybean oil | 283.51 |
| Iodine | 0.43 |
| Diethanolamine | 26.31 |
| Maleic anhydride | 26.43 |

| Component | Amount (grams) |
| --- | --- |
| Glycerin | 2.71 |
| Toluene | 300.00 |
| P-Toluenesulfonic acid | 0.61 |
| Diphenylmethane diisocyanate | 1.35 |

The above amounts of diethanolamine and iodine were added to the above amount of soybean oil with stirring. The mixture was stirred for 23 hours at a temperature between about 195° F. (90° C.) and about 236° F. (113° C.). Then the above amounts of maleic anhydride, glycerin and phosphoric acid were added. The mixture was refluxed over a Dean-Sark receiver for 9-hours and then distilled out of the solvent to give clear liquid soybean oil-polyol with a hydroxyl number of 56. An amount of 10.00 grams of the reaction product was then reacted with the above disclosed amount of diphenylmethane diisocyanate, yielding a solid polyurethane material based upon soybean oil.

Example 24

| Component | Amount (grams) |
| --- | --- |
| Soybean oil | 365.40 |
| Iodine | 0.64 |
| Diethanolamine | 39.49 |
| Maleic anhydride | 40.00 |
| Glycerin | 4.07 |
| Sulfuric acid | 0.40 |
| Diphenylmethane diisocyanate | 1.25 |

The above amounts of diethanolamine and iodine were added to the above amount of soybean oil with stirring. The mixture was stirred for 23 hours at a temperature between about 195° F. (90° C.) and about 236° F. (113° C.) to give a first reaction product. Then 35.75 grams of the first reaction product was mixed with the above amounts of maleic anhydride, glycerin and sulfuric acid were reacted at 220° F. (104.4° C.) for 2-hours to give a second reaction product. The remaining portion of the first reaction product and the second reaction product were mixed and stirred for 22-hours at a temperature of between about 220° F. (104.4° C.) and about 270° F. (132.2° C.) to give a third reaction product of a clear liquid soybean oil-polyol with a hydroxyl number of 50. An amount of 10.00 grams of the third reaction product was then reacted with the above disclosed amount of diphenylmethane diisocyanate, yielding a solid polyurethane material based upon soybean oil.

Example 25

| Component | Amount (grams) |
| --- | --- |
| Soybean oil | 389.62 |
| Iodine | 0.68 |
| Diethanolamine | 42.10 |
| Maleic anhydride | 42.65 |
| Glycerin | 4.34 |
| Phosphoric acid | 0.61 |
| Diphenylmethane diisocyanate | 1.28 |

The above amounts of diethanolamine and iodine were added to the above amount of soybean oil with stirring. The mixture was stirred for 23 hours at a temperature of between about 195° F. (90° C.) and about 236° F. (113° C.) to give a first reaction product. Then 38.11 grams of the first reaction product was mixed with the above amounts of maleic anhydride, glycerin and sulfuric acid were reacted at 220° F. (104.4° C.) for 2.5-hours to give a second reaction product. The second reaction product was mixed with the remaining portion of the first reaction product and stirred for 25-hours at a temperature of between about 210° F. (98.8° C.) and about 265° F. (129.4° C.) under vacuum to give a third reaction product of a clear liquid soybean oil-polyol with a hydroxyl number of 52. An amount of 10.00 grams of the third reaction product was then reacted with the above disclosed amount of diphenylmethane diisocyanate, yielding a solid polyurethane material based upon soybean oil.

Example 26

| Component | Amount (grams) |
| --- | --- |
| Soybean oil | 373.38 |
| Iodine | 0.65 |
| Diethanolamine | 40.35 |
| Maleic anhydride | 40.87 |
| Glycerin | 4.16 |
| p-Toluenesulfonic acid | 0.58 |
| Diphenylmethane diisocyanate | 1.30 |

The above amounts of diethanolamine and iodine were added to the above amount of soybean oil with stirring. The mixture was stirred for 24 hours at a temperature of between about 195° F. (90° C.) and about 235° F. (112.8° C.). Then the above amounts of maleic anhydride, glycerin and p-toluenesulfonic acid were added and the mixture was stirred for 26-hours at a temperature of between about 210° F. (98.8° C.) and about 270° F. (132.2° C.) under vacuum to give a clear liquid soybean oil-polyol with a hydroxyl number of 51. An amount of 10.00 grams of the reaction product was then reacted with the above disclosed amount of diphenylmethane diisocyanate, yielding a solid polyurethane material based upon soybean oil.

Example 27

| Component | Amount (grams) |
| --- | --- |
| Soybean oil | 477.69 |
| Iodine | 0.84 |
| Diethanolamine | 51.62 |
| Maleic anhydride | 64.87 |
| Glycerin | 4.44 |
| Sulfuric acid | 0.55 |
| Diphenylmethane diisocyanate | 0.68 |

The above amounts of diethanolamine and iodine were added to the above amount of soybean oil with stirring. The mixture was stirred for 23 hours at a temperature of between about 190° F. (87.8° C.) and about 240° F. (115.6° C.). Then the above amounts of maleic anhydride, glycerin and sulfuric acid were added and the mixture was stirred for 24-hours at a temperature of between about 190° F. (87.8° C.) and about 240° F. (115.6° C.) under vacuum to give a clear liquid soybean oil-polyol with a hydroxyl number of 28. An amount of 10.00 grams of the reaction product was then reacted with the above disclosed amount of diphenylmethane diisocyanate, yielding a solid polyurethane material based upon soybean oil.

Example 28

| Component | Amount (grams) |
|---|---|
| Soybean oil | 397.92 |
| Iodine | 0.70 |
| Diethanolamine | 43.00 |
| Maleic anhydride | 54.03 |
| Glycerin | 3.70 |
| Phosphoric acid | 0.66 |
| Diphenylmethane diisocyanate | 0.69 |

The above amounts of diethanolamine and iodine were added to the above amount of soybean oil with stirring. The mixture was stirred for 24 hours at a temperature of between about 200° F. (93.3° C.) and about 230° F. (110.0° C.). Then the above amounts of maleic anhydride, glycerin and phosphoric acid were added and the mixture was stirred for 22-hours at a temperature of between about 180° F. (82.2° C.) and about 270° F. (132.2° C.) under vacuum to give a clear liquid soybean oil-polyol with a hydroxyl number of 30. An amount of 10.00 grams of the reaction product was then reacted with the above disclosed amount of diphenylmethane diisocyanate, yielding a solid polyurethane material based upon soybean oil.

Example 29

| Component | Amount (grams) |
|---|---|
| Soybean oil | 319.32 |
| Iodine | 0.56 |
| Diethanolamine | 34.15 |
| Maleic anhydride | 42.12 |
| Glycerin | 2.97 |
| Toluene | 300.00 |
| Phosphoric acid | 0.53 |
| Diphenylmethane diisocyanate | 0.66 |

The above amounts of diethanolamine and iodine were added to the above amount of soybean oil with stirring. The mixture was stirred for 24 hours at a temperature of between about 195° F. (90.6° C.) and about 240° F. (115.6° C.). Then the above amounts of maleic anhydride, glycerin, toluene and phosphoric acid were added and the mixture was refluxed over a Dean-Stark receiver for 9 hours, and then distilled out of the solvent to give a clear liquid soybean oil-polyol with a hydroxyl number of 31. An amount of 8.97 grams of the reaction product was then reacted with the above disclosed amount of diphenylmethane diisocyanate, yielding a solid polyurethane material based upon soybean oil.

Example 30

| Component | Amount (grams) |
|---|---|
| Soybean oil | 302.62 |
| Iodine | 0.53 |
| Diethanolamine | 32.70 |
| Maleic anhydride | 40.98 |
| Glycerin | 2.81 |
| Toluene | 300.00 |
| Sulfuric acid | 0.36 |
| Diphenylmethane diisocyanate | 0.70 |

The above amounts of diethanolamine and iodine were added to the above amount of soybean oil with stirring. The mixture was stirred for 24 hours at a temperature of between about 195° F. (90.6° C.) and about 240° F. (115.6° C.). Then the above amounts of maleic anhydride, glycerin, toluene and sulfuric acid were added and the mixture was refluxed over a Dean-Stark receiver for 10 hours, and then distilled out of the solvent to give a clear liquid soybean oil-polyol with a hydroxyl number of 28. An amount of 10.00 grams of the reaction product was then reacted with the above disclosed amount of diphenylmethane diisocyanate, yielding a solid polyurethane material based upon soybean oil.

Example 31

| Component | Amount (grams) |
|---|---|
| Soybean oil | 278.67 |
| Iodine | 0.49 |
| Diethanolamine | 30.11 |
| Maleic anhydride | 37.73 |
| Glycerin | 2.59 |
| Toluene | 300.00 |
| p-Toluenesulfonic acid | 0.40 |
| Diphenylmethane diisocyanate | 0.68 |

The above amounts of diethanolamine and iodine were added to the above amount of soybean oil with stirring. The mixture was stirred for 23 hours at a temperature of between about 195° F. (90.6° C.) and about 235° F. (112.8° C.). Then the above amounts of maleic anhydride, glycerin, toluene and p-toluenesulfonic acid were added and the mixture was refluxed over a Dean-Stark receiver for 11 hours, and then distilled out of the solvent to give a clear liquid soybean oil-polyol with a hydroxyl number of 28. An amount of 10.00 grams of the reaction product was then reacted with the above disclosed amount of diphenylmethane diisocyanate, yielding a solid polyurethane material based upon soybean oil.

Example 32

| Component | Amount (grams) |
|---|---|
| Soybean oil | 286.99 |
| Iodine | 0.50 |
| Diethanolamine | 31.01 |
| Maleic anhydride | 38.41 |
| Glycerin | 2.67 |
| Toluene | 250.00 |
| Methanesulfonic acid | 0.42 |
| Diphenylmethane diisocyanate | 0.70 |

The above amounts of diethanolamine and iodine were added to the above amount of soybean oil with stirring. The mixture was stirred for 22 hours at a temperature of between about 195° F. (90.6° C.) and about 240° F. (115.6° C.). Then the above amounts of maleic anhydride, glycerin, toluene and methanesulfonic acid were added and the mixture was refluxed over a Dean-Stark receiver for 10 hours, and then distilled out of the solvent to give a clear liquid soybean oil-polyol with a hydroxyl number of 30. An amount of 10.00 grams of the reaction product was then reacted with the above disclosed amount of diphenylmethane diisocyanate, yielding a solid polyurethane material based upon soybean oil.

Example 33

| Component | Amount (grams) |
|---|---|
| Soybean oil | 206.40 |
| Iodine | 0.36 |
| Diethanolamine | 22.30 |
| Maleic anhydride | 28.76 |
| Glycerin | 1.93 |
| Sulfuric acid | 0.24 |
| Diphenylmethane diisocyanate | 0.55 |

The above amounts of diethanolamine and iodine were added to the above amount of soybean oil with stirring. The mixture was stirred for 23 hours at a temperature of between about 195° F. (90.6° C.) and about 240° F. (115.6° C.) to give a hydroxylated soybean oil. The above amounts of maleic anhydride and glycerin were mixed and reacted at 220° F. (104.4° C.) for 1-hour to form a tri-functional coupling reagent. The hydroxylated soybean oil and the tri-functional coupling reagent were mixed together with the above amount of sulfuric acid, and then stirred under vacuum for 29 hours at a temperature of between about 220° F. (104.4° C.) and about 270° F. (132.2° C.) to give a clear liquid soybean oil-polyol with a hydroxyl number of 24. An amount of 10.00 grams of the reaction product was then reacted with the above disclosed amount of diphenylmethane diisocyanate, yielding a solid polyurethane material based upon soybean oil.

Example 34

| Component | Amount (grams) |
|---|---|
| Soybean oil | 413.83 |
| Iodine | 0.73 |
| Diethanolamine | 44.72 |
| Maleic anhydride | 56.20 |
| Glycerin | 3.85 |
| Phosphoric acid | 0.68 |
| Diphenylmethane diisocyanate | 0.68 |

The above amounts of diethanolamine and iodine were added to the above amount of soybean oil with stirring. The mixture was stirred for 23 hours at a temperature of between about 195° F. (90.6° C.) and about 240° F. (115.6° C.) to give a first reaction product. The above amounts of maleic anhydride, glycerin and phosphoric acid were mixed with 132.48 grams of the first reaction product and stirred at 220° F. (104.4° C.) for 2 hours to give a second reaction product. The second reaction product was mixed with the remaining portion of the first reaction product, and then stirred under vacuum for 28 hours at a temperature of between about 210° F. (98.9° C.) and about 275° F. (135.0° C.) to give a clear liquid soybean oil-polyol with a hydroxyl number of 28. An amount of 10.00 grams of the soybean oil-polyol was then reacted with the above disclosed amount of diphenylmethane diisocyanate, yielding a solid polyurethane material based upon soybean oil.

The above description discloses several methods and materials of the present invention. Variations of the methods and materials, as well as alterations in the equipment may be utilized in accordance with the invention and the described examples are not intended to limit the scope of the invention. Such variations will become apparent to those skilled in the art from a consideration of this disclosure or practice of the invention disclosed herein. Consequently, it is not intended that this invention be limited to the specific embodiments disclosed herein, but that it cover all variations, modifications and alternatives coming within the true scope and spirit of the invention. It is to be understood that while certain forms of the present invention have been illustrated and described herein, it is not to be limited to the specific forms or configuration of equipment described and shown.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

What is claimed and desired to be secured by Letters Patent is as follows:

1. A process of synthesizing a high molecular weight natural oil polyol with a functionality of at least two in a single reaction vessel, the process comprising:
    a) forming a mixture including plant oil based unsaturated triglyceride, diethanolamine, a catalyst, a tri-functional chain extender and a di-functional coupling reagent; and
    b) reacting the mixture at a temperature of from about 70° F. to about 310° F. while simultaneously removing water from the mixture for a period of time of at least three hours, so as to form a chain of the triglyceride and the coupling reagent, wherein the chain of the triglyceride and the coupling reagent is a plant oil based polyol product with a functionality of at least 2.

2. The process of claim 1 wherein removing water from the mixture includes refluxing the mixture over a Dean-Stark trap.

3. The process of claim 1 wherein removing water from the mixture includes reacting the mixture under a vacuum.

4. The process of claim 1 wherein the period of time is in a range of from 3-hours to about 24-hours.

5. The process of claim 1 wherein the tri-functional chain extender is selected from the group consisting of small molecular weight polyol and polyamines having three or more active hydrogen functional groups, and combinations thereof.

6. The process of claim 1 wherein the tri-functional chain extender is selected from the group consisting of trimethanylolethane, glycerin, triethanolamine and combinations thereof.

7. The process of claim 1 wherein the di-functional coupling reagent is selected from the group consisting of dicarboxylic acids, dicarboxylic anhydrides, and combinations thereof.

8. The process of claim 1 wherein the di-functional coupling reagent is selected from the group consisting of maleic acid, maleic anhydride, succinic acid, succinic anhydride, glutaric acid, glutaric anhydride, phthalic acid, phthalic anhydride, fumaric acid, adipic acid, and combinations thereof.

9. The process of claim 1 wherein the catalyst is selected from the group consisting of organic acids and inorganic acids, and combinations thereof.

10. The process of claim 1 wherein the catalyst is selected from the group consisting of p-toluenesulfonic acid, methanesulfonic acid, sulfuric acid and phosphoric acid, and combinations thereof.

11. The process of claim 1 wherein the plant oil based unsaturated triglyceride is selected from the group consisting of a corn oil, soybean oil, rapeseed oil, sunflower oil, sesame seed oil, peanut oil, safflower oil, olive oil, cotton seed oil, linseed oil, walnut oil, tung oil and combinations thereof.

12. The process of claim 1 wherein the plant oil based unsaturated triglyceride is a soybean oil.

13. A high molecular weight plant oil based polyol with a functionality of at least 2 according to claim 1.

14. The polyol of claim 13, wherein the polyol is a soybean oil based polyol.

15. A process of preparing a polyurethane comprising the steps of:
   a) reacting at least one plant oil based polyol of claim 1, wherein the plant oil based polyol includes a functionality of at least 2, with at least one of an aromatic isocyanate, an aliphatic isocyanate and an isocyanate terminated pre-polymer, so as to form a polyurethane.

16. A polyurethane according to claim 15.

* * * * *